United States Patent [19]

Plotke

[11] Patent Number: 5,715,160
[45] Date of Patent: Feb. 3, 1998

[54] MOTION CONTROL EVALUATION EMPLOYING A FOURIER TRANSFORM

[76] Inventor: Robert Jay Plotke, 6665 Whitewood St., Simi Valley, Calif. 93063

[21] Appl. No.: 517,185

[22] Filed: Aug. 21, 1995

[51] Int. Cl.$^6$ .............................. G05B 19/18; A61B 5/00
[52] U.S. Cl. .................. 364/167.01; 482/900; 482/902; 128/774
[58] Field of Search ........................... 364/188, 189, 364/167.01, 551.01, 576, 578, 579, 580, 726.01–726.07; 128/774, 775–781, 782, 734, 745, 630, 670, 905; 482/900, 902

[56] References Cited

U.S. PATENT DOCUMENTS

| | | | |
|---|---|---|---|
| 4,683,891 | 8/1987 | Cornellier et al. | 128/630 |
| 4,894,777 | 1/1990 | Negishi et al. | 364/188 |
| 5,078,152 | 1/1992 | Bend et al. | 128/774 |
| 5,344,324 | 9/1994 | O'Donnell et al. | 128/745 |
| 5,375,610 | 12/1994 | LaCourse et al. | 128/782 |

*Primary Examiner*—Reba I. Elmore
*Assistant Examiner*—Thomas E. Brown
*Attorney, Agent, or Firm*—Roger A. Marrs

[57] ABSTRACT

An evaluation system is disclosed herein for analyzing, displaying and feedback of digital signals derived from a source of analog motion and analog force. The system includes sensors for detecting physical movement following a point-by-point measurement procedure and a digital signal generator for introducing the sensed motion and force signals to a Fourier measuring unit for analysis. Separate analysis circuits for motion characteristics and force or load characteristics from the derived signals are employed for discrete measurement. The resultant measurements and/or values are introduced to a comparator network where the measurements and/or values are compared with stored individual data and to stored universal standards. A display device such as a video monitor, visual or auditory device receives the result's of the compared motion and force measurements and values. A feedback loop introduces the same measurements and values back to the source of sensor data to control, update and regulate further motion and force applied by the source.

5 Claims, 1 Drawing Sheet

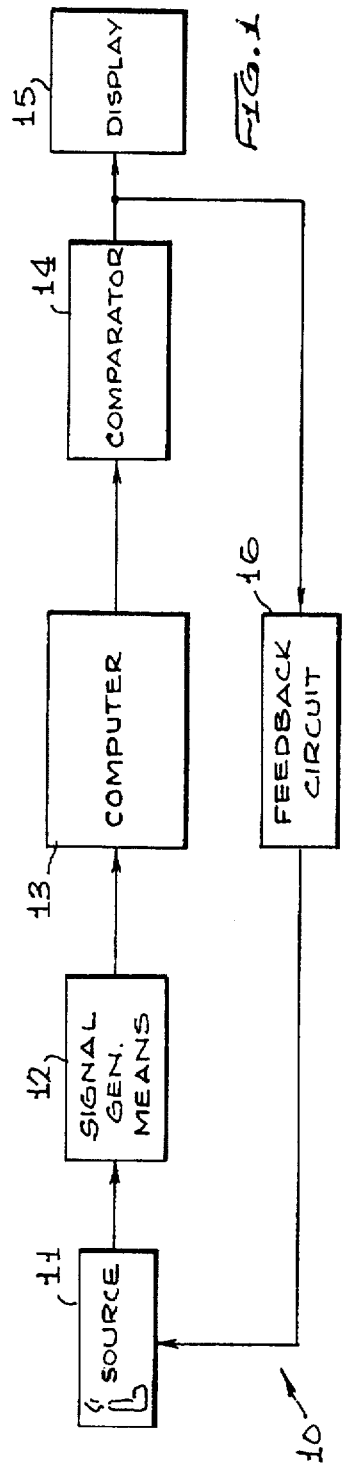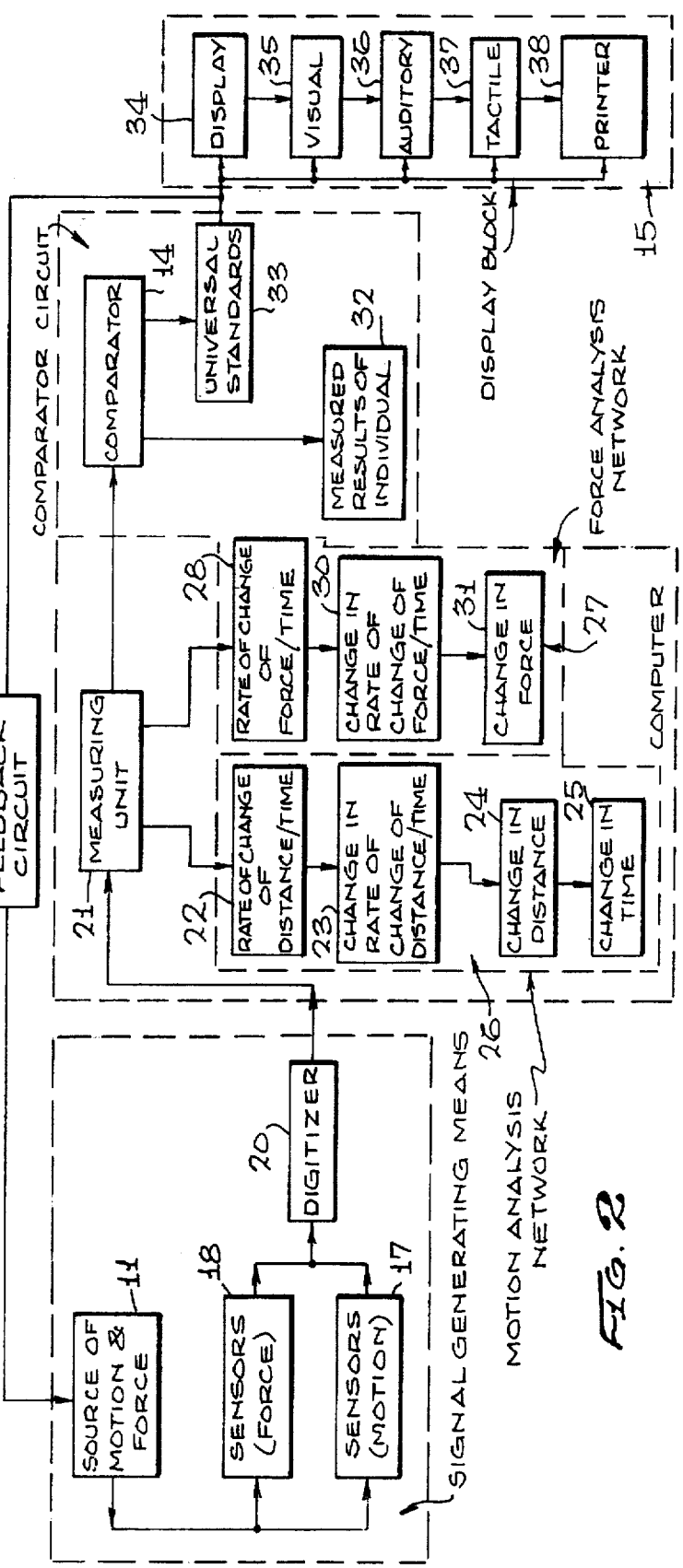

MOTION CONTROL EVALUATION EMPLOYING A FOURIER TRANSFORM

BACKGROUND OF THE INVENTION

1. Field of the Invention

The present invention relates to a system of analyzing, displaying and feedback of motion control data, and more particularly to a novel system of analysis and interpretation Using Fourier transform and a feedback circuit for controlling and regulating movement.

2. Brief Description of the Prior Art

In the past, it has been the conventional practice to sense or detect psychological measures in a static fashion for presentation in a display or the like. Generally, the measurements relate to motion data but the analysis subsequent to detection is employed for mechanical or regulatory control without feedback or awareness purposes. Plus, the prior systems are static and not dynamic in their usefulness. In some instances, prior systems employ feedback in the form of a kinesiological visual display. However, such a display of the data is not in real time and is not a dynamic visual representation of the true movement or motion form. Furthermore, prior art systems relate to measures of force at acceleration in a given time frame but do not relate to the sensing or analyzing or measuring or evaluation including display and feedback of a member in movement in one plane and even a second and third plane of motion in a given time frame.

Some of the above prior systems are disclosed in U.S. Pat. Nos. 4,894,777; 5,375,610; 4,683,891 and 5,344,324. These methods and systems all pose problems and difficulties which are mentioned above. Additionally, these prior systems and devices do not determine how well a person is physically performing by measuring the amount or degree of control that this person experiences as reflected by Fourier transform. No attempt is made to define "skill" or performance as a function of the Fourier transform. Prior systems define "skill" by how well a person can perform tasks which are given to them. Also, no attempt is made to set standards which when exceeded are fed back into the source of movement or force source in order to alter the source to protect the participant such as providing a warning, decreasing a load or stopping a machine altogether. None of the prior art systems goes beyond mere display or recording of the exceeded standards or parameters.

Therefore, a long-standing need has existed to provide a novel means for deriving and analyzing analog measurements of motion and force and to provide digital results of the analyzed data after evaluation back to the originating analog motion and analog force sources. The feedback of analyzed data controls the source of motion and force in a closed loop or circuit.

SUMMARY OF THE INVENTION

Accordingly, the above problems and difficulties are avoided by the present invention which provides a novel system of analyzing, displaying and transmitting feedback of analyzed data to motion control sources. In one form of the system, analog motion and analog force is sensed for physical movement such as the distance and force employed in the movement of arms and legs, and the analog signals are introduced to a signal generating means for producing a digital signal representative of the motion and force sense data. The digital signals are then sent to a computer which includes a measuring unit employing Fourier analysis techniques from the digital input signals. The analysis includes networks for dealing with rate of change of distance/time; change in rate of distance/time; change in distance; and change in time. Such analysis relates to motion data. An additional circuit is employed in the analysis dealing with load or force movement which encompasses rate of change of force/time; change in rate of the force over time change; and the change is applied force. The results from the motion network and the force network within the measuring unit can be introduced to a readout, such as a display of information in terms of units of force, units of motion and rate of change. In any event, the output from the measuring unit within the computer is introduced to a comparative analysis circuit which includes previously stored measured results in one memory and universal standards stored in another memory whereby the measured results for an individual can be correlated with the universal standards in the other storage. Next, the output of the comparative analysis is introduced to a display which may take the form of a monitor, CRT presentation, auditory, tactile or hard copy output. Simultaneously, and in a dynamic fashion, the output information from the comparative analysis circuit is introduced through a feedback circuit to the source of analog motion and source of analog force so that the analyzed data is used to control the source of these functions.

Therefore, it is among the primary objects of the present invention to provide a novel motion evaluation and analysis system which employs a motion sensing means as a change in physical position of a human or human-like movement within a given time frame wherein the evaluation and analysis is performed through the use of Fourier analysis.

Another object of the present invention is to provide analysis of a digital signal representing motion and force which is achieved by a computer employing a Fourier transform with integrated smoothing and comparative factors represented in discrete measures.

Another object of the present invention is to provide a novel system whereby standards of human or human-like performance may be acquired through the statistical evaluation data from at least three fundamental measures whereby these standards may be employed for human or human-like condition as a whole or specific movements or activities.

Another object of the present invention is to provide a novel evaluation system whereby specific training can be enhanced by encompassing the knowledge of how a task is to be performed with evaluated movement control into an optimized training result wherein optimization includes enhanced speed of motor acquisition and level of execution control.

A further object of the present invention is to provide a novel motion and force evaluation system which employs a measuring unit for receiving motion and force data signals for Fourier analysis and which includes not only comparative analysis with the results of the Fourier analysis but introduces the resultant data for display and feedback purposes to the originating motion and force source.

Yet another object of the present invention is to provide a novel motion, distance and force evaluation system for an individual which employs Fourier transform to determine how well the person is performing in a physical way by virtue of the amount of control that this person exhibits and wherein the control is circulated back to the original source of the motion or force in order to alter its function.

Yet another object of the invention is to provide a predetermined or universal set of standards to which a participant's operating standards can be compared with the resultant differential being introduced via a feedback loop to the original source of the individuals participating in the comparison so that alteration of the source is available for his protection.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a block diagram incorporating the novel motion control evaluation system of the present invention;

FIG. 2 is a block diagram detailing the components of the blocks used in the system shown in FIG. 1.

DESCRIPTION OF THE PREFERRED EMBODIMENT

Referring to FIG. 1, the novel evaluation system of the present invention is illustrated in the general direction of arrow 10 which includes a source 11 of motion and force. The source may be an exercising machine or the like and the motion and force movements derived are in analog form. Distance is also included in the definition of motion. The analog movement and force is detected by sensors in a signal generating means 12 that converts the analog sensed signals into digital format for introduction to a computer 13. The computer includes circuits for Fourier analysis based on motion and force parameters which are included in internal storage. The output of the analysis from the computer is introduced to a comparator 14 which includes individual measured results and universal standards pertaining to the motion and force functions. Any differential between the individual and standard comparison analysis is then introduced to a display 15 which may be visual, auditory, video monitor, hard copy or the like. In addition to the display, analyzed information is conducted through a feedback circuit 16 to the source 11 for control purposes. The output from the comparator is connected and parallel to the display 15 and the feedback circuit 16 so that a dynamic and closed loop system is provided that not only displays information for review but which automatically and simultaneously controls the source of the motion and force functions.

Referring now in detail to FIG. 2, it can be seen that the inventive system relates to the method and apparatus for analyzing, displaying and feedback of information for motion and force control. In the past, motion sensing has not been employed as a change in physical position of a human or human-like movement in a given time frame and it has not been applied as an analysis of human or human-like control through the use of Fourier analysis.

Referring to FIG. 2 in detail, the source 11 involves a human to which a device, such as an exercising machine or the like, may be involved. For example, the participant or user may rest on a bench with his hands on the bar so that in moving the weighted bar to and from his torso, arm movement will apply a force and a distance in accordance with the motion involved. Therefore, a source of motion and force 11 is provided. This motion and force is sensed by individual sensors 17 and 18 related to motion and force respectively so that the physical movement is followed. Since the source of motion and force is analoged, the sensors are analog sensors and the output of the sensors is sent to a digital signal generator means 20 that outputs the digital information to the computer 13 in which a measuring unit 21 is incorporated. The measuring unit is employed for Fourier analysis which develops a Fourier transform with integrated smoothing and comparative factors represented in discrete measures.

Within the measuring unit 21, there is provided subcircuits and networks which deal with the rate of change of distance/time, as indicated by network 22, a network 23 dealing with change in rate of change of distance/time, a network 24 concerning change in distance and a change of time network 25. All of the above are included in a motion network, indicated by numeral 26. With respect to force, a force network 27 includes a rate of change of force/time network 28, a change in rate of change of force/time 30 and a change in force network 31. All of these circuits 22–31 inclusive are used in the Fourier analysis which is outputed from the measuring unit 21 to the comparator 14. The output from the measuring unit 21 may be considered data which has been preliminarily analyzed when introduced to the comparator 14. The comparator 14 includes individual merited standards 32 which may be compared with universal standards 33 that are also internally stored. The resultant analyzed and evaluated signals from the comparator based on the outputed Fourier analysis data with the resultant comparison between the individual and universal standards is then introduced to the display 15 which may be a video display or monitor 34, a visual screen 35, an auditory device 36, a tactile device 37, or a printer 38 which outputs a hard copy or the like. In parallel with the display and simultaneously therewith, the output from the comparator 14 is introduced to the feedback circuit 16. The input to the feedback circuit may be considered a human control data signal which is then introduced to motion and force source 11 so that the source apparatus may be controlled to protect the user or participant. Therefore, the object of the invention is met by employing the continuing experience or skill of the participant to perform a task that converts the experience as a function of a Fourier transform into data that is not only displayed but is fed back to the source for control purposes. Therefore, the performance of a person in a physical way is measured by the amount of control that this person exhibits as reflected by Fourier transform.

In view of the foregoing, it can be seen that a unique and novel system and method is disclosed by which physical movement serving as a source for analysis is sensed and converted from analog notation to a digital notation. The digital notation is then introduced to a computer or processing device and the digital formatted data is then processed using computer software. For use in the process, a Fourier analysis is employed using any or all types of Fourier transform calculations. At least four discrete mathematical representations are isolated from the transform and these four mathematical representations can be used to create standards. These standards may be used for feedback and quality of movement control analysis. The Fourier transform calculations and representations represent firstly, in a single wave form, a mathematical representation of the rate of change is noted, secondly, in multiple wave forms, a mathematical representation of the change in the rate of change is acquired, thirdly, in multiple wave forms, a mathematical representation of the change in frequency is acquired ongoing or selectively; and fourthly, in multiple wave forms, a mathematical representation of the change in amplitude is acquired.

After isolation from the transform for discrete mathematical representations, the resultant analyzed data is displayed in analog or digital mathematical expression format while the same resultant data is fed back to the source of movement and force by the feedback circuit. Last, the human participant or user is the source of motion and force and after analysis and evaluation, the human source receives control or behavior modifying signals which then alter the physical procedure being undertaken by the participant.

Therefore, a system is presented whereby standards of human or human-like performance is acquired through the statistical evaluation data from the three or four fundamental measures. These standards are for a human or human-like condition as a whole or specific movements or activities. The system provides standards for human or human-like control of performance and for safety performance parameters and for alert signaling employing visual, tactile and/or auditory generation. The human or human-like movement control is measured as to how fast a movement is performed, how much distance does the movement travel and how well that motion is accomplished. A specific movement or sequence of movements can be trained and modified and this training and modification creates the most efficient link between conscious desire and kinesthetic ability. Wave form functions of the source movements are evaluated in real time to detect the control of work and power wherein acquired data points of movement represent the human or human-like performance of a desired task.

The system provides for task specific training which is enhanced by encompassing the knowledge of how the task is to be performed with the evaluated movement control components into and optimized training result. Optimization includes enhanced speed of motor acquisition and level of execution control. Computerization of those movements controls and allows for the comparison of diminished control from the desired movement control enabling an evaluator to judge the significance of the movement control. A motion is analyzed with the resulting fundamental evaluation being a model of the rate of change for one movement cycle and the change in the rate of change for two or more in any variation of cycles.

The system provides a primary task or movement in one plane of motion which has encompassed within its Fourier spectrum the other two planes of motion. The system also provides a method of analytic evaluation of the primary movement regarding the frequency spectral shift, rate of change, and change in amplitude, in which the other two planes of motion can be "weighted" or proportioned as to how these planes of motion lend themselves to or detract themselves from the primary movementor task.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A physical movement control and evaluation system comprising:

a source of physical movement;

sensor means coupled to said source for deriving analog signals responsive to physical movement;

digital generator means connected to said sensor for converting said analog signals to digital signals;

a measuring unit receiving said digital signal and having analyzing means for evaluating motion and force measurements from said digital signals;

a display means connected to said measuring unit and said analyzing means for displaying said evaluated motion and force measurements;

feedback means coupled between said measuring unit and said source in parallel with said display means for introducing said evaluated motion and force measurements to said source for altering the physical movement;

said measurement unit includes a Fourier analysis network having a separate motion analysis circuit and a force analysis circuit;

said Fourier analysis network outputting said evaluated motion and force measurements being based on Fourier transform calculations;

said motion analysis circuit and said force analysis circuit are coupled in parallel to said Fourier analysis network;

said display means is selected from:
   a. visual display
   b. auditing display
   c. tactile display
   d. printer; and said display means includes means for displaying said evaluated motion and force measurements as analog or digital mathematical expressions.

2. A physical movement control and evaluation system comprising:

a source of physical movement;

sensor means coupled, to said source for deriving analog signals responsive to physical movement;

digital generator means connected to said sensor for converting said analog signals to digital signals;

a measuring unit receiving said digital signal and having analyzing means for evaluating motion and force measurements from said digital signals;

a display means connected to said measuring unit and said analyzing means for displaying said evaluated motion and force measurements;

feedback means coupled between said measuring unit and said source in parallel with said display means for introducing said evaluated motion and force measurements to said source for altering the physical movement;

said measurement unit includes a Fourier analysis network having a separate motion analysis circuit and a force analysis circuit;

said Fourier analysis network outputting said evaluated motion and force measurements being based on Fourier transform calculations;

said motion analysis circuit and said force analysis circuit are coupled in parallel to said Fourier analysis network;

said display means is selected from:
   a. visual display
   b. auditing display
   c. tactile display
   d. printer; and said Fourier transform calculations are expressed as either single or multiple waveforms.

3. The invention as defined in claim 2 wherein:

said single waveform expresses a mathematical representation of a rate of change; and said multiple waveform expresses a mathematical representation of a change in said rate of change, a mathematical representation of a change in frequency or a mathematical representation of a change in amplitude.

4. The invention as defined in claim 2 including:

a comparative analysis network coupled between said measuring unit and said display for receiving said evaluated motion and force measurements;

said comparative analysis network having, in parallel, an individual standard data storage and a universal standard data storage and further having circuit means for comparing said evaluated motion and force measurements with data in either or both said individual standard data storage or said universal standard data storage.

5. The invention as defined in claim 4 wherein:
said evaluated motion and force measurements are expressed in terms of units of motion and units of force and further expressed in terms of units of rate of change for motion and force.

* * * * *